United States Patent
Yukimasa et al.

(10) Patent No.: US 9,470,428 B2
(45) Date of Patent: Oct. 18, 2016

(54) POWER GENERATION SYSTEM

(75) Inventors: Akinori Yukimasa, Osaka (JP); Shigeki Yasuda, Osaka (JP); Junji Morita, Kyoto (JP); Atsutaka Inoue, Kyoto (JP); Hiroshi Tatsui, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 729 days.

(21) Appl. No.: 13/991,144

(22) PCT Filed: Dec. 13, 2011

(86) PCT No.: PCT/JP2011/006950
§ 371 (c)(1),
(2), (4) Date: May 31, 2013

(87) PCT Pub. No.: WO2012/081233
PCT Pub. Date: Jun. 21, 2012

(65) Prior Publication Data
US 2013/0252535 A1    Sep. 26, 2013

(30) Foreign Application Priority Data
Dec. 13, 2010   (JP) .................. 2010-276897

(51) Int. Cl.
*H01M 8/04* (2016.01)
*F24F 7/00* (2006.01)
(Continued)

(52) U.S. Cl.
CPC .. *F24F 7/00* (2013.01); *F01P 1/06* (2013.01); *F23L 17/005* (2013.01); *H01M 8/04955* (2013.01); *F01P 2001/005* (2013.01); *H01M 8/04014* (2013.01); *H01M 8/04164* (2013.01); *H01M 8/2475* (2013.01); *H01M 2250/10* (2013.01); *H01M 2250/405* (2013.01); *Y02B 90/14* (2013.01); *Y02B 90/16* (2013.01); *Y02E 60/50* (2013.01)

(58) Field of Classification Search
CPC ..................... H01M 8/04104; H01M 8/04223
See application file for complete search history.

(56) References Cited

U.S. PATENT DOCUMENTS

| | | | |
|---|---|---|---|
| 5,890,460 A | 4/1999 | Ball et al. | |
| 8,728,675 B2 * | 5/2014 | Ozeki | H01M 8/04223 429/428 |
| 2010/0244458 A1 | 9/2010 | Kotani et al. | |

FOREIGN PATENT DOCUMENTS

| | | |
|---|---|---|
| JP | 4-8724 U | 1/1992 |
| JP | 2001-132564 A | 5/2001 |

(Continued)

OTHER PUBLICATIONS

International Search Report issued in International Patent Application No. PCT/JP2011/006950 mailed on Jan. 17, 2012.
(Continued)

*Primary Examiner* — Patrick Ryan
*Assistant Examiner* — Julian Anthony
(74) *Attorney, Agent, or Firm* — McDermott Will & Emery LLP

(57) ABSTRACT

A power generation system of the present invention comprises: a power generation unit (1); a casing (2) that accommodates the power generation unit (1); a ventilator (3) that ventilates the interior of the casing (2); a first gas flow passage (5), arranged inside the casing (2), for a flow therethrough of gas which flows as the ventilator (3) operates; and a second gas flow passage (6), arranged inside the casing (2), for a flow therethrough of combustion exhaust gas from the power generation unit (1), wherein within the casing (2), the second gas flow passage (6) merges into the first gas flow passage (5).

19 Claims, 7 Drawing Sheets

(51) Int. Cl.
  *F23L 17/00*  (2006.01)
  *F01P 1/06*  (2006.01)
  *H01M 8/24*  (2016.01)
  *F01P 1/00*  (2006.01)

(56) References Cited

FOREIGN PATENT DOCUMENTS

| JP | 2002-317631 A | 10/2002 | | |
|----|---------------|---------|---|---|
| JP | 2003-217603 A | 7/2003 | | |
| JP | 2006-253020 A | 9/2006 | | |
| JP | 2007-048704 A | 2/2007 | | |
| JP | 2008-210631 A | 9/2008 | | |
| WO | WO2010/085222 | * | 7/2010 | ............ H01M 8/04 |

OTHER PUBLICATIONS

Chinese Office Action issued in Chinese Application No. 201180057976.7 mailing dated Feb. 4, 2015, with English translation.

* cited by examiner

POWER GENERATION SYSTEM

RELATED APPLICATIONS

This application is the U.S. National Phase under 35 U.S.C. §371 of International Application No. PCT/JP2011/006950, filed on Dec. 13, 2011, which in turn claims the benefit of Japanese Application No. 2010-276897, filed on Dec. 13, 2010, the disclosures of which Applications are incorporated by reference herein.

TECHNICAL FIELD

The present invention relates to power generation systems and in particular to the structure of a flow passage for the flow of combustion exhaust gas (flue gas) from a power generation unit.

BACKGROUND ART

Heretofore, there has been known an power generation system of the type that is provided with an exhaust pipe in connection with a duct arranged inside the building so as to extend in a vertical direction and through which the exhaust gas produced in the fuel cell is discharged (see, for example, Patent Literature 1).

CITATION LIST

Patent Literature

Patent Literature 1: JP-A-2008-210631

SUMMARY OF INVENTION

Technical Problem

Incidentally, in the power generation system as set forth in Patent Literature 1, it is arranged such that exhaust gas from the ventilation fan and exhaust gas from the fuel cell are discharged individually from the casing such as an armored container. Supposedly, these exhaust gases may also be, for example, a combustion exhaust gas resulting from combustion of the fuel gas not used in a power generation reaction in the combustor. However, such combustion exhaust gas possibly contains a combustible gas due to various reasons. This kind of problem possibly will arise not only in a fuel cell but also likewise in a power generation unit such as a gas engine power generator that exhausts a combustion exhaust gas.

The present invention was devised with a view to providing a solution to the problem in question. Accordingly, an object of the present invention is to provide a power generation system that more dilutes a combustible gas present in the combustion exhaust gas than conventional systems and then discharges the diluted combustible gas to outside the casing.

Solution to Problem

In order to solve the problem, there is provided, according to an aspect of the present invention, a power generation system. This power generation system comprises: a power generation unit; a casing that accommodates the power generation unit; a ventilator that ventilates the interior of the casing; a first gas flow passage, arranged inside the casing, for a flow therethrough of gas which flows as the ventilator operates; and a second gas flow passage, arranged inside the casing, for a flow therethrough of exhaust gas from the power generation unit; wherein within the casing, the second gas flow passage merges into the first gas flow passage.

Advantageous Effects of Invention

In accordance with the present invention, the combustible gas present in the combustion exhaust gas is more diluted than conventionally diluted and the discharged outside the casing.

These objects as well as other objects, features and advantages of the present invention will become apparent to those skilled in the art from the following detailed description with reference to the accompanying drawings.

DESCRIPTION OF EMBODIMENTS

Figure 1:
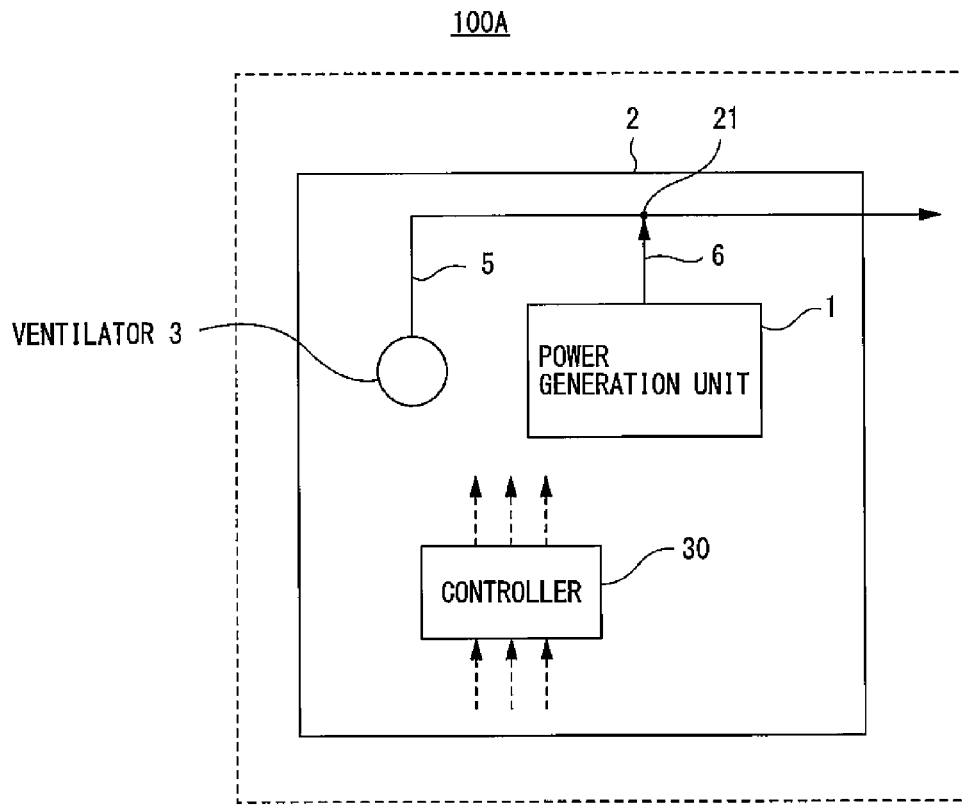
FIG. 1 is a block diagram schematically illustrating the configuration of a power generation system according to a first embodiment of the present invention.

Hereinafter, embodiments of the present invention will be described more specifically with reference to the drawing figures.

Embodiment 1

A power generation system according to a first embodiment of the present invention comprises: a power generation unit; a casing that accommodates the power generation unit; a ventilator that ventilates an interior of the casing; a first gas flow passage, arranged inside the casing, for a flow therethrough of gas which flows as the ventilator operates; and a second gas flow passage, arranged inside the casing, for a flow therethrough of combustion exhaust gas from the power generation unit, wherein within the casing, the second gas flow passage merges into the first gas flow passage.

In power generation apparatus, the combustion exhaust gas may contain a combustible gas. This takes place for instance when incomplete combustion occurs in the power generation unit. In that case, if it is configured such that exhaust gas from the ventilation fan and the exhaust gas from the fuel cell are individually discharged out of the casing, the combustible gas present in the combustion exhaust gas is discharged outside the casing without dilution. However, according to the configuration of the first embodiment, the combustion exhaust gas from the power generation unit is mixed with atmosphere gas within the casing, whereby the combustible gas present in the combustion exhaust gas is diluted and discharged outside the casing.

The power generation system may comprise a controller that controls the ventilator to operate at least during the time in which the power generation system operates to generate electric power.

Generally, the power generation unit discharges combustion exhaust gas during the time in which the power generation system operates to generate electric power. Therefore, according to the aforesaid configuration, during the power generation operation, the combustion exhaust gas from the power generation unit is mixed with atmosphere gas within the casing, whereby the combustible gas present in the combustion exhaust gas becomes diluted.

Here, it does not matter whether the ventilator is operated in a continuous mode of operation or in an intermittent mode of operation. The reason for this is that regardless of whether the ventilator is operated continuously or intermittently, the combustion exhaust gas from the power generation unit is mixed with atmosphere gas within the casing, whereby the combustible gas present in the combustion exhaust gas becomes diluted, unlike conventional power generation systems in which the first gas flow passage and the second gas flow passage do not merge into each other.

In addition, the power generation system to be hereinafter described employs such a configuration that the ventilator is placed in operation when the power generation unit is operating to generate electric power. This configuration however should not be considered limitative. This can be explained as follows. That is, even if the ventilator is placed in operation randomly regardless of whether or not the power generation unit is operating to generate electric power, there is a high potential for giving rise to a period of time for which the ventilator operates during the time in which the power generation unit discharges combustion exhaust gas. As an example for this, there is such a configuration that regardless of the operational status of the power generation unit, the ventilator is placed in operation periodically.

(Configuration)

FIG. 1 is a block diagram schematically illustrating the configuration of a power generation system according to the first embodiment of the present invention.

Referring to FIG. 1, there is shown a power generation system 100A according to the first embodiment. The power generation system 100A comprises: a power generation unit 1; a casing 2 that accommodates the power generation unit 1; a ventilator 3 that ventilates the interior of the casing 2; a first gas flow passage 5, arranged inside the casing 2, for a flow therethrough of gas which flows as the ventilator 3 operates; and a second gas flow passage 6, arranged inside the casing 2, for a flow therethrough of combustion exhaust gas from the power generation unit 1, wherein within the casing 2, the second gas flow passage 6 merges into the first gas flow passage 5 at a merging point 21.

The power generation unit 1 is a power generation unit that generates electric power from a fuel. And, the power generation unit 1 can be exemplified in the form of a fuel cell unit, a gas engine power generation unit or the like. In addition, the power generation unit 1 is provided with a combustor (not diagrammatically shown), and during the power generation operation, combustion exhaust gas is discharged from the combustor. For the case where the power generation unit 1 is implemented using a fuel cell unit, the combustion exhaust gas includes, by way of example, a combustion exhaust gas resulting from combustion of anode off-gas from the fuel cell in the combustor, a combustion exhaust gas resulting from combustion of hydrogen-containing gas, produced in a reformer, in the combustor and other like combustion exhaust gas. In addition, for the case where the power generation unit 1 is implemented using a gas engine power generation unit, the combustion exhaust gas includes, by way of example, a combustion exhaust gas from the gas engine serving as a combustor.

It suffices for the ventilator 3 to simply ventilate the interior of the casing 2. The ventilator 3 can be installed at any location in the casing 2. The configuration for intake of ventilation gas into the casing 2 by the ventilator 3 is not limited to a particular arrangement. For example, it may be arranged such that in the space where the casing 2 is disposed, ventilation gas is taken into the casing 2 through intake apertures formed in the casing 2. Alternatively, it may be arranged such that the first gas flow passage 5 and the intake gas flow passage are formed in a double pipe, whereby the line on one side of the double pipe (for example, the inside) serves as the first gas flow passage 5 and the ventilation gas is taken into the casing 2 through the line on the other side of the double pipe. The ventilator 3 is implemented using, for example, a fan or other like device.

In order that gas flows through the first gas flow passage 5 as the ventilator 3 operates, the first gas flow passage 5 is arranged so as to extend from inside to outside the casing 2.

The second gas flow passage 6 is provided to lead, within the casing 2, the combustion exhaust gas from the power generation unit 1 to the first gas flow passage 5. The power generation system 100A further includes a controller 30. The controller 30 is configured such that it controls the ventilator 3 to continue to operate at least until the discharge of combustion exhaust gas from the power generation unit 1 stops. It suffices that the controller 30 has control functions. The controller 30 includes an arithmetic processing unit and a storage unit that stores control programs. For example, the controller 30 can be exemplified in the form of a microcomputer, a PLC (Programmable Logic Controller) or other like device. In addition, the arithmetic processing unit can be exemplified in the form of MPU or CPU. The storage unit can be exemplified in the form of a memory. The controller 30 may be formed by either a single controller that executes centralized control or a plurality of controllers that execute decentralized control in cooperation with each other. In addition, the controller 30 can be installed at any location. For example, as shown in FIG. 1, the controller 30 may be housed within the casing 2, or mounted to the outer side of the casing 2, or it may be installed away from the casing 2.

(Operation)

Figure 2:
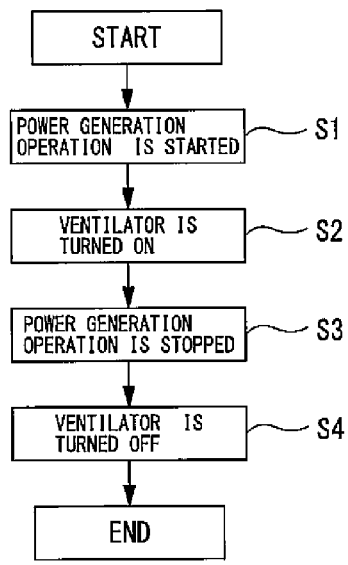
FIG. 2 is a flowchart representing control steps of the controller in the power generation system of FIG. 1.

Next, a description will be given with regard to an example of the operation of the power generation system 100A configured as described above. FIG. 2 is a flowchart showing control steps of the controller 30 in the power generation system 100A of FIG. 1.

Referring to FIG. 2, when the power generation system 100A starts operating to generate electric power (step S1), the controller 30 first controls the ventilator 3 to start operating (step S2). Then, when the power generation operation of the power generation system 100A is brought to a stop (step S3), the controller 30 controls the ventilator 3 to stop operating (step S4), and the control by the controller 30 is completed. In this case, the combustion exhaust gas from the power generation unit 1 flows by way of the second gas flow passage 6 into the first gas flow passage 5 at the merging point 21. This inflow of combustion exhaust gas from the power generation unit 1 is mixed with atmosphere gas from the ventilator 3 within the casing 2. Therefore, if the combustion exhaust gas contains a combustible gas, then the combustible gas present in the combustion exhaust gas becomes diluted in the flow passage situated at more downstream than the merging point 21 and through which the exhaust gas from the power generation unit 1 flows (i.e., in the portion of the first gas flow passage 5 situated at more downstream than the merging point 21).

Unlike conventional power generation systems in which the first gas flow passage and the second gas flow passage do not merge into each other within the casing 2, if the combustion exhaust gas contains a combustible gas, then the combustible gas present in the combustion exhaust gas is diluted in the power generation system 100A of the present first embodiment.

In addition, in the operations flow described above, the controller 30 is configured so as to control the ventilator 3 to operate during the power generation operation; however, there may be employed a configuration that activates the ventilator 3 also in a mode of operation different from the electric power generating mode of operation. As such a mode of operation, there can be given a start-up mode of operation, a shut-down mode of operation, a standby state et cetera. What is meant here by the "standby state" is such a state that after completion of the operation of stopping the power generation system 100A, the power generation system 100A is being placed in a state awaiting the next activation.

Modified Example 1

A power generation system according to the present first modified example may include a controller that controls, at the time of shutting down the power generation system, the ventilator to continue to operate at least until discharge of combustion exhaust gas from the power generation unit stops.

According to such a configuration, the combustion exhaust gas is mixed with atmosphere gas within the casing by operation of the ventilator until the discharge of combustion exhaust gas from the power generation unit stops, and if the combustion exhaust gas contains a combustible gas, the combustible gas contained is diluted and discharged to outside the casing.

Next, a specified description will be given regarding the first modified example of the power generation system 100A of the first embodiment.

Figure 3A:
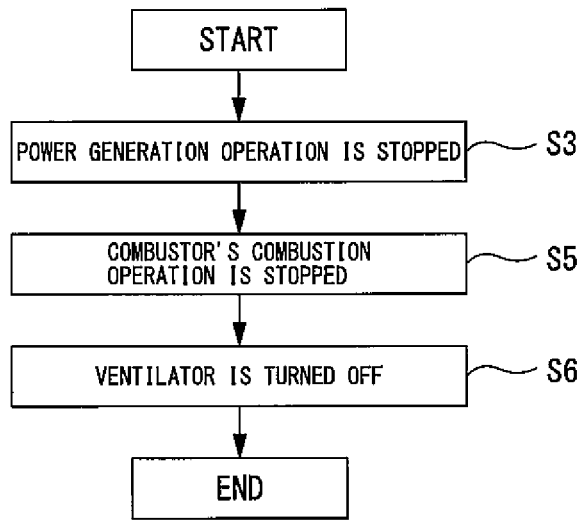
FIG. 3A is a flowchart representing control steps of the controller in a first modified example of the power generation system of FIG. 1.

FIG. 3A is a flowchart illustrating control steps of the controller in the first modified example of the power generation system 100A of FIG. 1. Referring to FIG. 3A, the controller 30 controls the power generation system 100A to stop generating electric power (step S1). And, the controller 30 controls the combustor (not diagrammatically shown) to stop its combustion operation (step S5). Then, the controller 30 controls the ventilator 3 to stop operating (step S6).

Here, the combustor is a device that produces combustion exhaust gas from the power generation unit 1. The combustor can be exemplified in the form of a combustor that combusts anode off-gas if the power generation unit is implemented using a fuel cell unit. In addition, the combustor can be exemplified in the form of a gas engine or the like if the power generation unit is implemented using a gas engine electric power generator.

In addition, in the first modified example, it is arranged such that as the controller 30 controls the combustor to stop its combustion operation, the ventilator 3 stops operating; however, there may be employed such a configuration that with detection that the combustor has stopped its combustion operation, the ventilator 3 is made to stop operating.

In this case, such stop detection is made by means of a detector that detects a signal generated associated with the operation of the combustor. For example, the detector can be exemplified in the form of a combustion detector mounted in the combustor, an output meter mounted in the air supply device that supplies air to the combustor, or other like detector.

In addition, although the start-up of the operation of the ventilator 3 is not mentioned in the present first modified embodiment, its start-up timing is optional. For example, it may be arranged such that as in the first embodiment, the ventilator 3 starts operating as the power generation system 100A starts operating to generate electric power. In this case, the combustion exhaust gas is mixed with atmosphere gas within the casing 2 by the operation of the ventilator 3 at least until the discharge of combustion exhaust gas from the power generation unit 1 stops, whereby the combustible gas present in the combustion exhaust gas becomes diluted. In addition, it may be arranged such that the ventilator 3 starts operating as the combustor starts its combustion operation. In this case, the combustible gas present in the combustion exhaust gas is diluted from the beginning of the discharge of combustion exhaust gas from the combustor 8.

In addition, in the first modified example, the timing that the ventilator 3 stops its operation as the combustor stops its combustion operation is not mentioned: however, its stop timing is optional. For example, it may be arranged such that the ventilator 3 immediately stops operating as the combustor stops its combustion operation.

Alternatively, it may be arranged such that after the combustor stops its combustion operation, the ventilator 3 continues to operate for some time and then stops operating. In this case, it may be arranged such that the ventilator 3 continues to operate at least during the time for which the residual gas, left in the exhaust gas flow passage at the time when the combustor stops its combustion operation, is purged by atmosphere gas within the casing 2. Because of this arrangement, even if the residual gas left in the exhaust gas flow passage when the combustor stops its combustion operation contains a combustible gas, the combustible gas contained is diluted and discharged by atmosphere gas within the casing.

Modified Example 2

A power generation system of the second modified example is provided, in the power generation system of the first embodiment, with a controller that controls, at the time of stopping the power generation system, the ventilator to continue to operate at least after the discharge of combustion exhaust gas from the power generation unit stops.

According to such a configuration, even if the residual gas, left in the exhaust gas flow passage, contains a combustible gas, the combustible gas contained can be diluted and discharged by atmosphere gas within the casing after the discharge of combustion exhaust gas from the power generation unit stops.

Next, a specified description will be given regarding a second modified example of the power generation system 100A of the first embodiment.

Figure 3B:
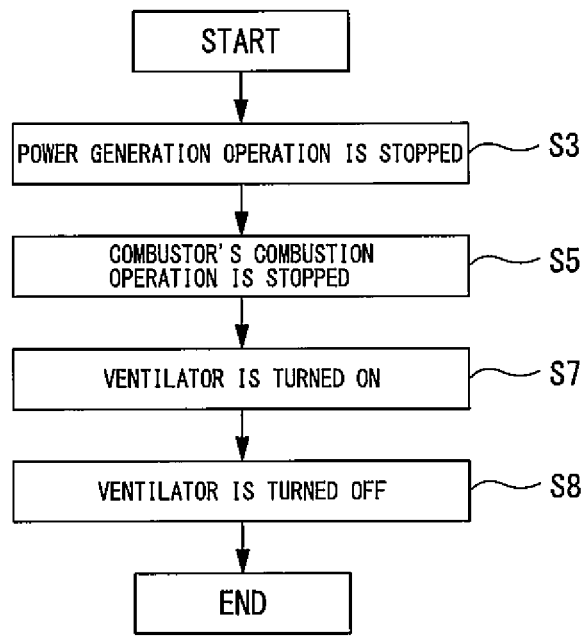
FIG. 3B is a flowchart representing control steps of the controller in a second modified example of the power generation system of FIG. 1.

FIG. 3B is a flowchart showing control steps of the controller in the second modified example of the power generation system 100A of FIG. 1. Referring now to FIG. 3B, the controller 30 controls the power generation system 100A to stop generating electric power (step S3). And, the controller 30 controls the combustor (not diagrammatically shown) to stop its combustion operation (step S5). Then, the controller 30 controls the ventilator 3 to start operating (step S7). Thereafter, the ventilator 3 is stopped (step S8). The time, for which the ventilator 3 is placed in operation after the combustor stops its combustion operation, is optional; however, it may be arranged such that the ventilator 3 continues to operate at least during the time for which the residual combustion exhaust gas remaining in the exhaust gas flow passage is being purged by atmosphere gas within the casing 2.

The combustor is a device that generates a combustion exhaust gas from the power generation unit 1. The combustor can be exemplified in the form of a combustor that combusts anode off-gas or other like device if the power generation unit is implemented using a fuel cell unit. In addition, the combustor can be exemplified in the form of a gas engine or other like device if the power generation unit is implemented using a gas engine power generator.

In the present second modified example, it is arranged such that as the controller 30 controls the combustor to stop its combustion operation, the ventilator 3 starts operating; however, there may be employed such a configuration that with detection that the combustor has stopped its combustion operation, the ventilator 3 starts operating.

In this case, such stop detection is made by means of a detector that detects a signal generated associated with the operation of the combustor. For example, the detector can be exemplified in the form of a combustion detector mounted in the combustor, an output meter mounted in an air supply device that supplies air to the combustor, or other like detector.

The timing of starting the operation of the ventilator 3 in the operations flow of the power generation system 100A is given by way of example. The start timing thereof is optional as long as the ventilator 3 continues to operate at least after the discharge of combustion exhaust gas from the power generation system stops. For example, as in the first embodiment, it may be arranged such that the ventilator 3 starts operating as the power generation system 100A starts generating electric power or it may be arranged that the ventilator 3 starts operating as the combustor starts its combustion operation.

Embodiment 2

A power generation system of the second embodiment comprises a condenser on the second gas flow passage, wherein the second gas flow passage merges into the first gas flow passage at a point more downstream than the condenser.

If the combustion exhaust gas flowing through the second gas flow passage and the atmosphere gas supplied from the casing through the first gas flow passage are mixed together, this reduces the level of humidity of the combustion exhaust gas. Therefore, by the arrangement described above, the amount of water condensation in the condenser increases and the degree of corrosion of the exhaust gas flow passage situated more downstream than the condenser is reduced to a further extent, when compared to the case where the first and the second gas flow passages merge into each other at upstream of the condenser.

Figure 4:
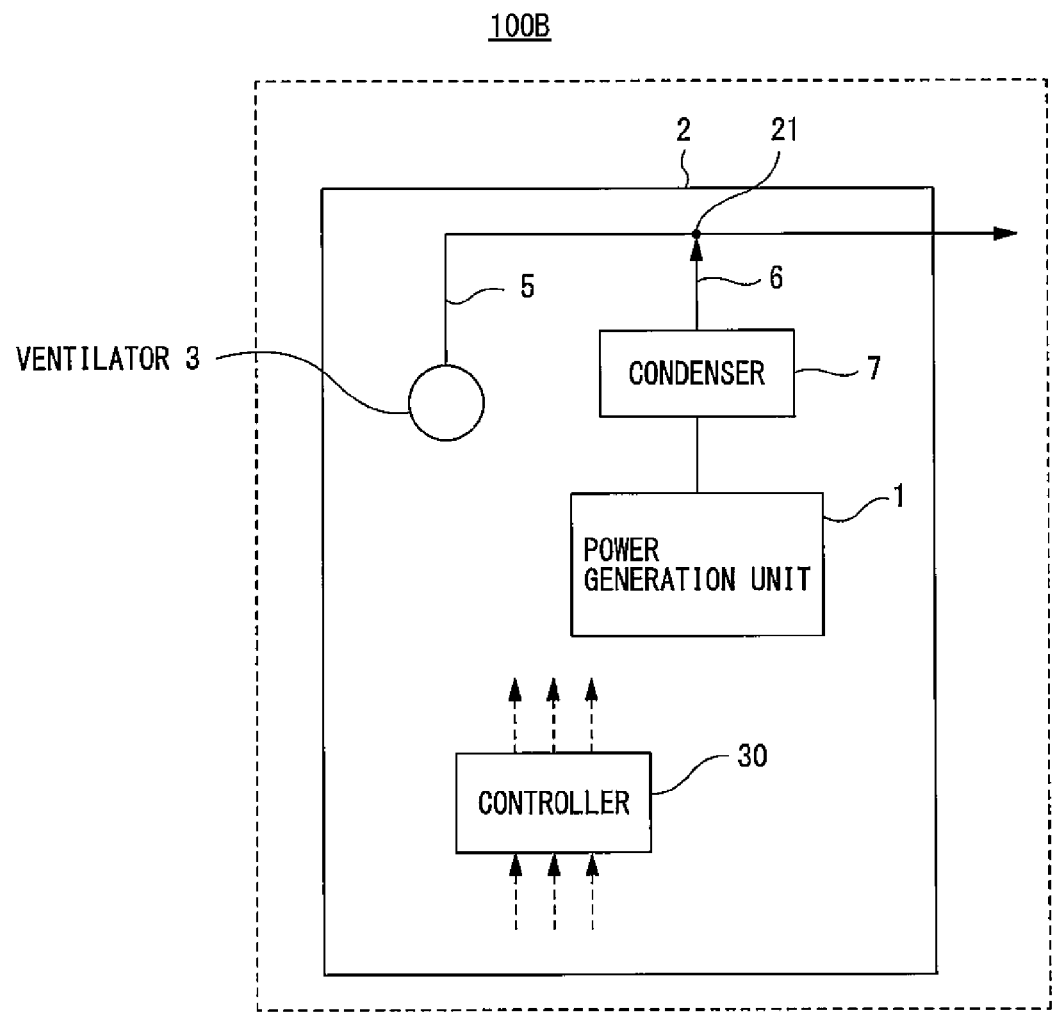
FIG. 4 is a block diagram schematically illustrating the configuration of a power generation system according to a second embodiment of the present invention.

FIG. 4 is a block diagram schematically illustrating the configuration of a power generation system according to the second embodiment. In the power generation system 100B of the second embodiment, a condenser 7 is provided on the second gas flow passage 6 and the second gas flow passage 6 merges into the first gas flow passage 5 at more downstream than the condenser 7. Configurations other than this of the power generation system 100B of the second embodiment are the same as those of the power generation system 100A of the first embodiment and its operations are the same as those of the power generation system 100 of either the first embodiment or the first modified example. Accordingly, their description is omitted here. Since the condenser 7 can be implemented using a conventionally well-known condenser, its description is omitted here.

Embodiment 3

A power generation system of the third embodiment is provided, in the power generation system of any of the first embodiment, the first modified example, the second modified example and the second embodiment, with a combustion air supply device that supplies combustion air to the combustor and a controller that controls, at the time of stopping the power generation system, the ventilator to operate at least after the combustion air supply device stops operating.

According to such a configuration, even if the residual gas, left in the exhaust gas flow passage, contains a combustible gas, the combustible gas contained can be diluted and discharged by atmosphere gas within the casing after the combustion air supply device stops operating.

Figure 5:
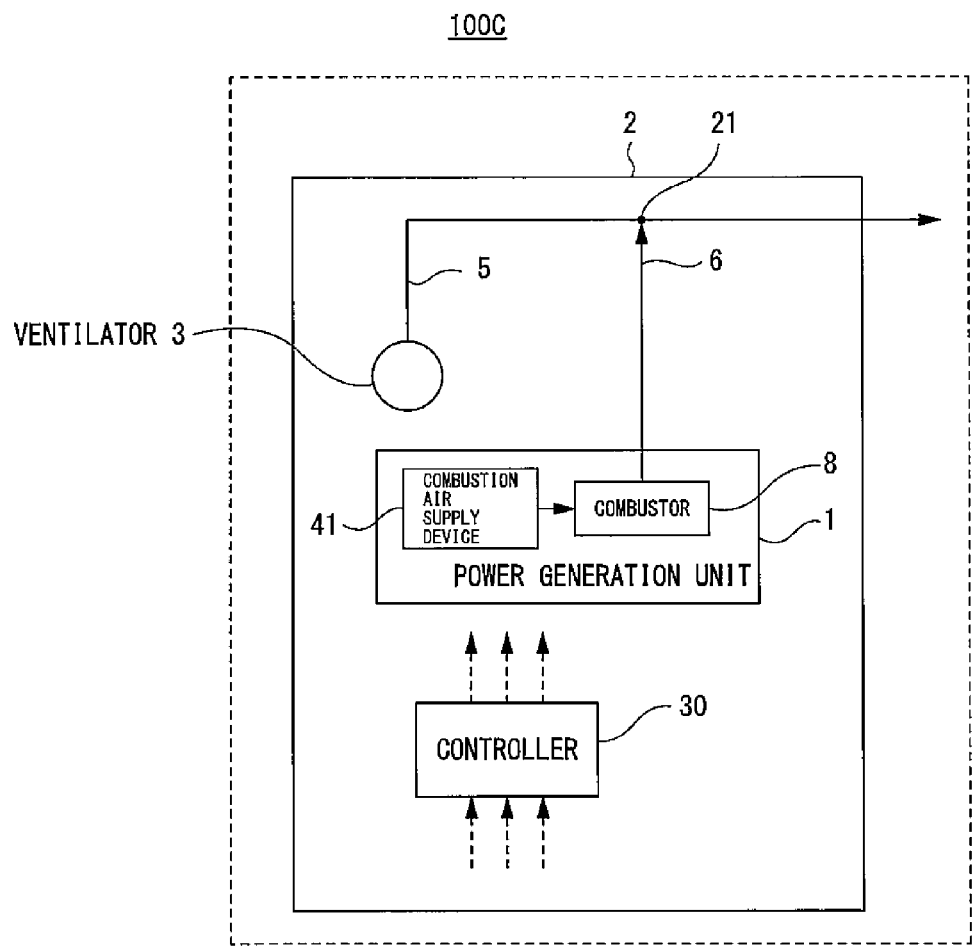
FIG. 5 is a block diagram schematically illustrating the configuration of a power generation system according to a third embodiment of the present invention.

FIG. 5 is a block diagram schematically illustrating the configuration of a power generation system according to the third embodiment. The power generation system 100C of the third embodiment has basically the same configuration as that of the power generation system 100A of the first embodiment but differs from the power generation system 100A in the following respects.

That is, according to the power generation system 100C of the third embodiment, the power generation unit 1 includes a combustion air supply device 41 that supplies combustion air to a combustor 8. The combustion air supply device 41 is formed, for example, by a sirocco fan or other like device. The combustor 8 is a combustor as described in the first embodiment.

Next, a description will be given regarding an example of the operation of the power generation system 100C of the third embodiment configured as above.

The following operation to be hereinafter described is the same as the operation in the first embodiment, with the exception that the ventilator 3 continues to operate for some time after the combustion air supply device 41 stops operating and is thereafter brought to a stop.

Figure 6:
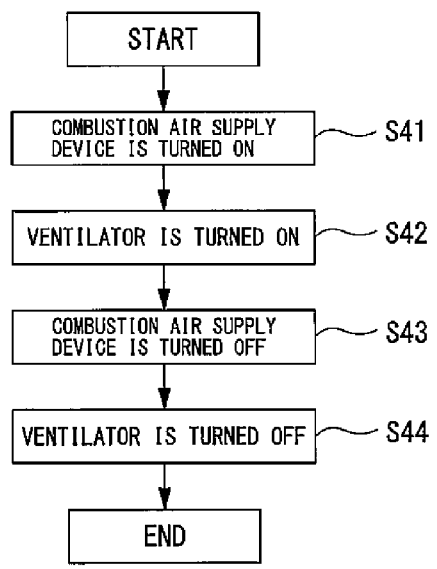
FIG. 6 is a flowchart representing control steps of the controller in the power generation system of FIG. 5.

FIG. 6 is a flowchart representing control steps of the controller 30 in the power generation system 100C of FIG. 5.

In the following, a description will be given regarding the difference from the power generation system 100A of the first embodiment.

Referring now to FIG. 6, the controller 30 first controls the combustor 8 to start its combustion operation as the power generation system 100C is activated, and at which time the controller 30 controls the combustion air supply device 41 to operate (step S41). The controller 30 controls the ventilator 3 to start operating upon startup of the combustion air supply device 41 (step S42). In addition, it may be arranged such that in step S41, the combustion air supply device 41 performs a pre-purge prior to the combustor 8 starting its combustion operation. In this case, it may be arranged such that in step S42, the ventilator 3 is made to operate during the pre-purge.

On the other hand, the controller 30 controls the combustor 8 to stop its combustion operation as the power generation system 100C stops generating electric power, and at which time the controller 30 controls the combustion air supply device 41 to stop supplying combustion air (step S43).

The controller 30 controls the ventilator 3 to continue to operate after the combustion air supply device 42 stops operating and thereafter controls the ventilator 3 to stop operating (step S44), thereby to complete its control. In addition, the time, for which the ventilator 3 is placed in operation after the combustion air supply device 41 stops operating, is optional: however, it may be arranged such that the ventilator 3 continues to operate at least during the time for which the residual combustion exhaust gas remaining in the exhaust gas flow passage is purged by atmosphere gas within the casing 2.

In addition, it may be arranged such that in step S43, the combustion air supply device 41 carries out a post-purge after the combustor 8 stops its combustion operation. In this case, it may be arranged such that the ventilator 3 is operated during the post-purge in step S44.

According to the operations flow described above, the ventilator 3 starts operating as the combustion air supply device 41 starts operating, whereby the combustible gas present in the combustion exhaust gas becomes diluted from the beginning of the discharge of combustion exhaust gas from the combustor 8. In addition, the aforesaid exemplified fuel cell system is arranged such that the controller 30 controls the ventilator 3 to start and stop its operation as the controller 30 controls the combustion air supply device 41 to star and stop its operation; however, there may be adopted such a configuration that with the detection made by means of a detector (not diagrammatically shown) that the combustion air supply device 41 starts or stops its operation, the controller 30 controls the ventilator 3 to start or stop its operation.

In addition, the timing of startup of the ventilator 3 is optional and therefore is not limited to the above example. For example, it may be arranged such that as in the first embodiment, the ventilator 3 starts operating as the power generation system 100C starts generating electric power.

Modified Example 3

A third modified example of the third embodiment is provided, in the power generation system of any of the first embodiment, the first modified example, the second modified example, the second embodiment and the third embodiment, with a combustion air supply device that supplies combustion air to the combustor and a controller that controls the combustion air supply device to operate even after the combustor stops its combustion operation.

According to such a configuration, even if the residual gas remaining in the exhaust gas flow passage contains a combustible gas, the combustible gas contained can be diluted and discharged by atmosphere gas within the casing after the combustor stops its combustion operation.

Next, a description will be given regarding an example of the operation of the power generation system 100C of the present third modified example configured as above.

Figure 7:
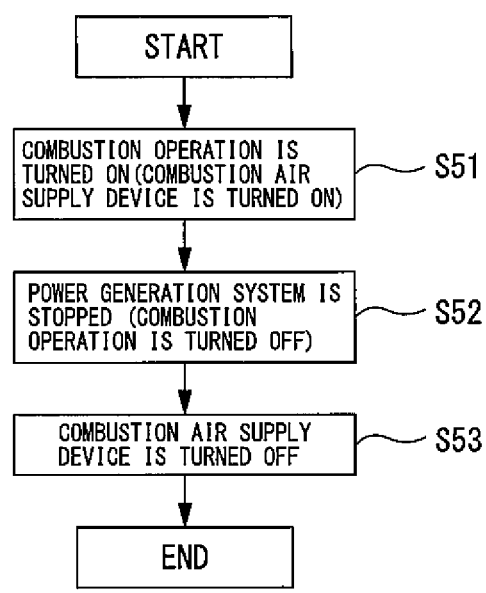
FIG. 7 is a flowchart representing control steps of the controller in a third modified example of the power generation system of FIG. 5.

FIG. 7 is a flowchart representing control steps of the controller 30 in the power generation system 100C of the present third modified example.

Referring now to FIG. 7, the controller 30 first controls the combustor 8 to start its combustion operation as the power generation system 100C starts up. At this time, the controller 30 also controls the combustion air supply device 41 to operate (step S51). On the other hand, the controller 30 controls the combustor 8 to stop its combustion operation as the power generation system 100C stops generating electric power (step S52). Meanwhile, the controller 30 controls the combustion air supply device 41 to continue to operate. This makes it possible that even if the residual combustion exhaust gas remaining in the second gas flow passage 6 contains a combustible gas, the combustible gas contained is diluted and discharged by air supplied from the combustion air supply device 41.

Thereafter, the controller 30 controls the combustion air supply device 41 to stop operating (step S53) and its control is completed.

Here, it suffices that the combustion air supply device 41 continues to operate after the combustor 8 stops its combustion operation, and the period of time for which the combustion air supply device 41 continues to operate after the combustor 8 stops operating is optional. For example, the above duration may be a period of time within which the residual gas remaining in the exhaust gas flow passage is purged by atmosphere gas within the casing 2.

Embodiment 4

In a power generation system according to the fourth embodiment, the power generation unit includes a combustor that combusts combustible gas and a fuel cell, and the second gas flow passage comprises a combustion exhaust gas flow passage through which the combustion exhaust gas from the combustor flows and a cathode off-gas flow passage through which the cathode off-gas from the fuel cell flows.

According to such a configuration, even if the combustion exhaust gas contains a combustible gas, the combustible gas contained can be diluted not only with aid of atmosphere gas within the casing from the first gas flow passage, but also it is diluted by cathode off-gas from the cathode off-gas flow passage. Therefore, as compared to the power generation system of the first embodiment, the combustible gas present in the combustion exhaust gas is more diluted and discharged to outside the casing.

There may further be provided an oxidizing gas supply device that provides the supply of oxidizing gas to the fuel cell and a controller that controls, at the time of shutting down the power generation system, the power generation system to stop generating electric power while controlling the oxidizing gas supply device to operate even after the combustor stops its combustion operation.

According to such a configuration, even if the residual gas remaining in the exhaust gas flow passage contains a combustible gas, the combustible gas contained can be diluted and discharged by oxidizing gas supplied from the oxidizing gas supply device after the combustor stops operating.

Figure 8:
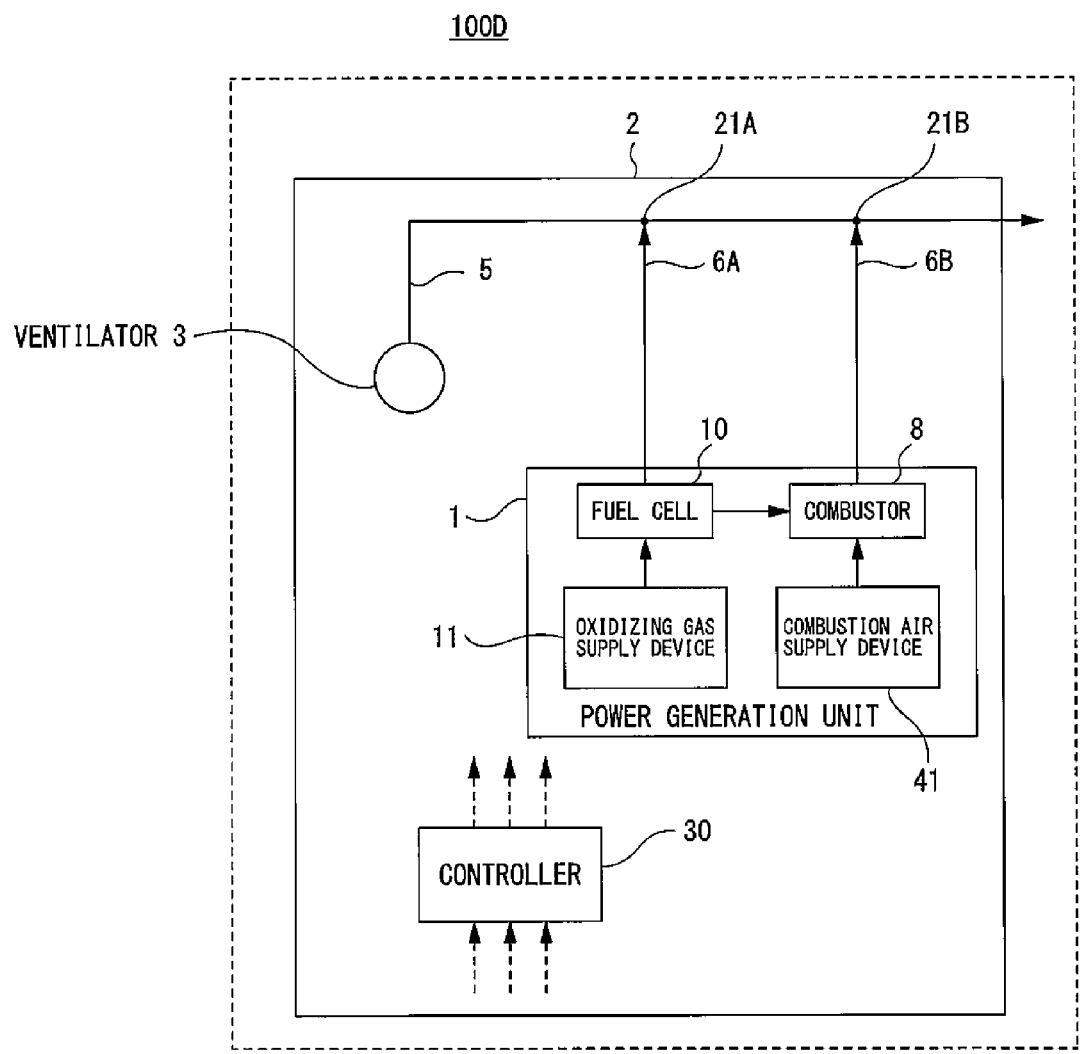
FIG. 8 is a block diagram schematically illustrating the configuration of a power generation system according to a fourth embodiment of the present invention.

FIG. 8 is a block diagram schematically illustrating the configuration of a power generation system according to the fourth embodiment of FIG. 8. The power generation system 100D of the fourth embodiment has basically the same configuration as that of the power generation system 100C of the third embodiment but differs from the power generation system 100C in the following respects.

That is, in the power generation system 100D of the fourth embodiment, the power generation unit 1 includes a combustor 8 that combusts combustible gas and a fuel cell 10, and the second gas flow passage 6 comprises a cathode off-gas flow passage 6A through which the cathode off-gas from the fuel cell 10 flows and a combustion exhaust gas flow passage 6B through which the combustion exhaust gas from the combustor 8 flows. The cathode off-gas flow passage 6A merges into the first gas flow passage 5 at a merging point 21A whereas the combustion exhaust gas flow passage 6B merges into the first gas flow passage 5 at a merging point 21B. In addition, it does not matter which one of the cathode off-gas flow passage 6A and the combustion exhaust gas flow passage 6B merges into the first gas flow passage 5 at more upstream than the other. As the fuel cell 10, there may be employed a conventionally known fuel cell that is exemplified in the form of a solid polyelectrolyte fuel cell, a solid oxide fuel cell, a phosphoric acid fuel cell or other like fuel cell. The power generation unit 1 further includes an oxidizing gas supply device 11 that supplies air as an oxidizing gas to the fuel cell 10. The oxidizing gas supply device 11 is implemented using, for example, a blower. In the fuel cell 10, the oxidizing gas supplied from the oxidizing gas supply device 11 is used in a power generation reaction with fuel gas. And, the oxidizing gas not used in the power generation reaction is discharged from the fuel cell 10 as a cathode off-gas. The combustor 8 is implemented using an anode off-gas combustor as shown by way of example in the third embodiment. This is, however, just an example and it does not matter that the combustor 8 is in any form of combustor as long as it is a combustor capable of combusting combustible gas. In the fuel cell 10, the fuel gas supplied from a fuel gas supply device (not diagrammatically shown) reacts with the oxidizing gas supplied from the oxidizing gas supply device 11. And, the unused fuel gas in the power generation reaction is supplied, as an anode off-gas, to the combustor 8 and burned there. The combustion exhaust gas resulting from such combustion is discharged from the combustor 8 to the combustion exhaust gas flow passage 6B.

Next, a description will be given regarding an example of the operation of the power generation system 100D of the fourth embodiment configured as above.

Figure 9:
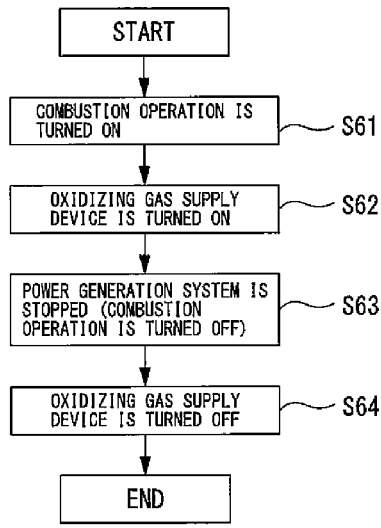
FIG. 9 is a flowchart representing control steps of the controller in the power generation system of FIG. 8.

FIG. 9 is a flowchart representing control steps of the controller 30 in the power generation system 100D of the present fourth embodiment.

Referring now to FIG. 9, the controller 30 first of all controls the combustor 8 to start its combustion operation as the power generation system 100D is activated (step S61). In addition, the controller 30 controls the oxidizing gas supply device 11 to operate (step S62). The startup of the combustion operation of the combustor 8 and the startup of the operation of the oxidizing gas supply device 11 may take place at the same time, or alternatively either one of them may take place earlier than the other.

Meanwhile, the controller 30 controls the combustor 8 to stop its operation as the power generation system 100D stops generating electric power (step S63).

Thereafter, the controller 30 controls the oxidizing gas supply device 11 to stop operating (step S64) and its control is completed.

Here, it suffices that the oxidizing gas supply device 11 continues to operate after the combustor 8 stops operating, and the period of time for which the oxidizing gas supply device 11 continues to operate after the combustor 8 stops operating is optional. For example, the above duration may be a period of time within which the residual gas remaining in the exhaust gas flow passage is purged by atmosphere gas within the casing 2.

In addition, the aforesaid exemplified fuel cell system is arranged such that the controller 30 controls the oxidizing gas supply device 11 to start and stop its operation as the controller 30 controls the combustor 8 to start and stop its operation; however, there may be adopted such a configuration that with detection made by means of the detector (not diagrammatically shown) that the combustor 8 starts or stops its operation, the controller 30 controls the oxidizing gas supply device 11 to start or stop its operation.

Additionally, the timing of starting up the operation of the ventilator 3 is optional and therefore is not limited to the above example. For example, it may be arranged such that as in the first embodiment, the ventilator 3 is made to start operating as the power generation system 100D starts generating electric power.

Embodiment 5

The fifth embodiment is an embodiment that exemplarily shows a configuration that employs an external combustion device together with a power generation system according to any one of the first embodiment, the first modified example, the second modified example, the second embodiment, the third embodiment, the third modified example and the fourth embodiment.

In the power generation system according to the fifth embodiment, it is arranged such that the first gas flow passage extends to outside the casing and merges into the combustion exhaust gas flow passage of an external combustion device.

According to such a configuration, even if the combustion exhaust gas from the external combustion device contains a combustible gas, the combustible gas contained can be diluted and discharged to outside the combustion exhaust gas flow passage of the external combustion device at least during the time in which the ventilator is in operation, unlike the conventional power generation systems in which the combustion exhaust gas flow passage of the external combustion device and the first gas flow passage do not merge into each other.

Figure 10:
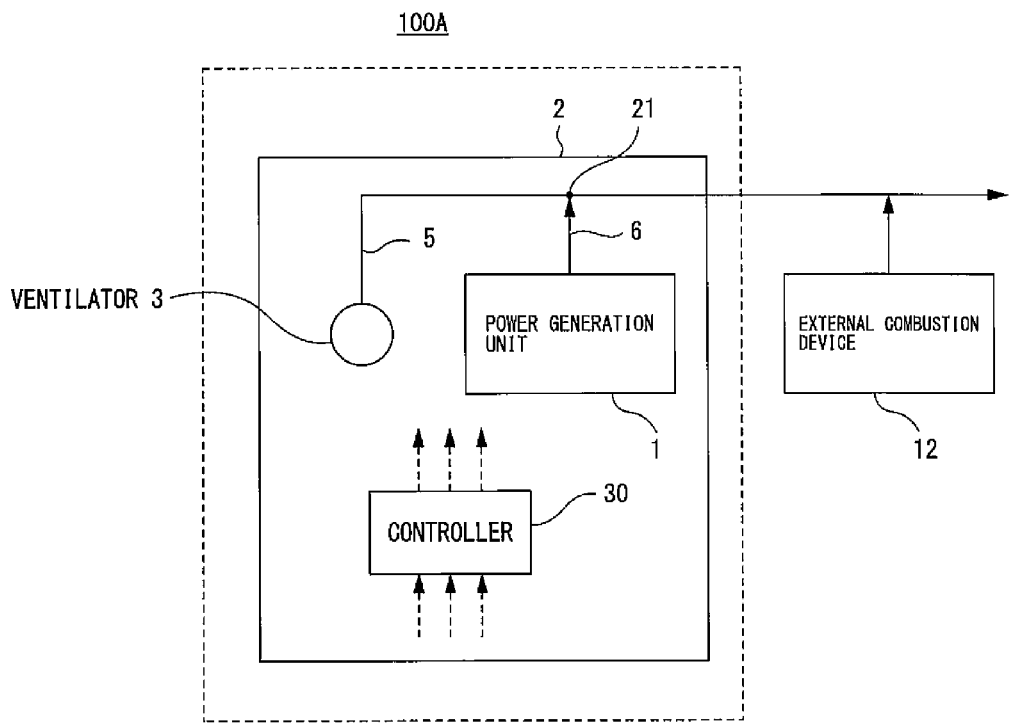
FIG. 10 is a block diagram schematically illustrating the configuration of a power generation system according to a fifth embodiment of the present invention.

FIG. 10 is a block diagram schematically illustrating the configuration of a power generation system according to the fifth embodiment.

As shown in FIG. 10, in the power generation system according to the fifth embodiment, it is configured such that the first gas flow passage 5 extends to outside the casing 2 so as to merge into the combustion exhaust gas flow passage of an external combustion device 12.

Referring to FIG. 10, the power generation system 100A of the first embodiment is illustrated as an example power generation system; however, the power generation system may be implemented using any one of the power generation systems 100A-100D according to the first modified example, the second modified example, the second embodiment, the third embodiment and the third modified example.

The external combustion device 12 is equipment configured to combust fuel gas to generate heat that is supplied to a heat load (not shown). The external combustion device 12 is, for example, a boiler. When placed in operation, the external combustion device 12 combusts a fuel gas and discharges a combustion exhaust gas that contains water. The heat load includes, for example, space heating, bath, shower et cetera.

The configuration of the combustion exhaust gas flow passage of the external combustion device is optional as long as the combustion exhaust gas is discharged from the external combustion device 12 to the outside. In addition, it may be arranged such that the combustion exhaust gas flow passage of the external combustion device 12 is provided with a back-flow prevention mechanism such as a check valve (not diagrammatically shown) that prevents the gas from the first gas flow passage 5 from flowing backward. In addition, it may be arranged such that the first gas flow passage 5 is provided with a back-flow prevention mechanism; such as a check valve (not diagrammatically shown) that prevents the gas from the combustion exhaust gas flow passage 13 from flowing backward.

Modified Example 4

The fuel cell system of the fourth modified example is characterized in that it further has the following features with respect to the fuel cell system of any one of the first to the fifth embodiments and the first to the third modified examples.

As a first configuration example, there is provided such a configuration that the ventilator 3 operates so that its discharge pressure is higher than the pressure of gas at the merging point 21. That is, in its specifications, the ventilator 3 is designed to operate so that its discharge pressure is higher than the pressure of gas at the merging point 21. Accordingly, there is no need for the controller to control the operation of the ventilator 3 so as to render its discharge pressure higher than the pressure of gas at the merging point 21.

As a second configuration example, there is provided such a configuration that in the power generation system, the controller 30 controls the operation of the ventilator 3 so that its discharge pressure becomes higher than the pressure of gas at the merging point 21 where the first gas flow passage 5 and the second gas flow passage 6 merge into each other.

In the second configuration example, the power generation system is provided, somewhere along the first gas flow passage 6 and at more upstream than the merging point 21, with a backflow detector (not diagrammatically shown) that is configured to detect if the exhaust gas flows backward, or is provided with a flow rate detector that is configured to directly or indirectly detect the flow rate of gas flowing through the first gas flow passage 6 at more upstream than the merging point 21.

On the other hand, the relationship between the detection output of either the backflow detector or the flow rate detector and the manipulated variable of the ventilator 3 is found beforehand and stored in the controller 30. And, based on the detection output of either the backflow detector or the flow rate detector and the relationship between the discharge pressure of the ventilator 3 and the manipulated variable of the ventilator 3, the controller 30 outputs a predetermined manipulated variable to the ventilator 3, whereby the operation of the ventilator 3 is controlled so that the pressure of discharge of the ventilator 3 becomes higher than the pressure of gas at the merging point 21.

The backflow detector may be exemplified in the form of a pressure sensor that detects the level of pressure of exhaust gas, an $O_2$ sensor that detects the level of $O_2$, a $CO_2$ sensor that detects the level of $CO_2$, a temperature sensor that detects the degree of exhaust gas temperature or a humidity sensor that detects the degree of exhaust gas humidity.

The following is a method of detecting a backflow of exhaust gas by use of a backflow detector as exemplarily shown above.

If the exhaust gas from the second gas flow passage 6 flows back in the direction of the first gas flow passage 5, this results in an increase in pressure level in the first gas flow passage 5. Therefore, the power generation system may be configured such that there is provided a pressure sensor that detects the level of pressure in the first gas flow passage 5 and the controller 30 detects a backflow of exhaust gas if the level of pressure detected by the pressure sensor increases.

If the exhaust gas from the second gas flow passage 6 flows back to the first gas flow passage 5, this results in a decrease in level of $O_2$ in the first gas flow passage 5. Therefore, the power generation system may be configured such that there is provided an $O_2$ sensor that detects the level of $O_2$ inside the first gas flow passage 5 and the controller 30 detects a backflow of exhaust gas if the level of $O_2$ detected by the $O_2$ sensor decreases.

If the exhaust gas from the second gas flow passage 6 flows back to the first gas flow passage 5, this results in an increase in level of $CO_2$ in the first gas flow passage 5. Therefore, the power generation system may be configured such that there is provided a $CO_2$ sensor that detects the level of $CO_2$ in the first gas flow passage 5 whereby the controller 30 detects a backflow of exhaust gas if the level of $CO_2$ detected by the $CO_2$ sensor increases.

If the exhaust gas from the second gas flow passage 6 flows back to the first gas flow passage 5, this results in an increase in degree of temperature in the first gas flow passage 5. Therefore, the power generation system may be configured such that there is provided a temperature sensor that detects the degree of temperature in the first gas flow passage 5 whereby the controller 30 detects a backflow of exhaust gas if the degree of temperature detected by the temperature sensor increases.

If the exhaust gas from the second gas flow passage 6 flows back to the first gas flow passage 5, this results in an increase in degree of humidity in the first gas flow passage 5. Therefore, the power generation system may be configured such that there is provided a humidity sensor that detects the degree of humidity in the first gas flow passage 5 whereby the controller 30 detects a backflow of exhaust gas if the degree of humidity detected by the humidity sensor increases.

Examples of the flow rate detector includes a flow rate sensor that detects the flow rate of exhaust gas in the first gas flow passage 5, an electric current sensor that detects the operating current of the ventilator 3 and a rotating speed sensor that detects the rotating speed of the ventilator 3.

The following is a method that employs a flow rate detector as exemplarily shown above so as to detect a decrease in flow rate of the exhaust gas flowing through the first gas flow passage 5.

If the differential pressure (P1-P2) between the discharge pressure, P1, of the ventilator 3 and the pressure, P2, at the merging point 21 (P2) decreases, this causes the flow rate of exhaust gas in the first gas flow passage 5 to decrease. Therefore, the power generation system may be configured such that there is provided along the first gas flow passage 5 a flow rate sensor and the controller 30 detects a decrease in the flow rate of exhaust gas flowing through the first gas flow passage 5 if the flow rate detected by the flow rate sensor decreases.

If the differential pressure described above decreases, this causes the flow rate of exhaust gas in the first gas flow passage 5 to decrease. At this time, the operating current of the ventilator 3 decreases. Therefore, the power generation system may be configured such that there is provided an electric current sensor that detects the operating current of the ventilator 3 and the controller 30 detects a decrease in the flow rate of exhaust gas in the first gas flow passage 5 if the operating current of the ventilator 3 detected by the electric current sensor decreases.

If the differential pressure described above decreases, this causes the flow rate of exhaust gas in the first gas flow passage 5 to decrease. At this time, the rotating speed of the ventilator 3 increases. Therefore, the power generation system may be configured such that there is provided a rotating speed sensor that detects the rotating speed of the ventilator 3 and the controller 30 detects a decrease in the flow rate of exhaust gas in the first gas flow passage 5 if the rotating speed of the ventilator 3 detected by the rotating speed sensor increases.

In addition, the backflow and the flow rate detectors are example configurations by which the controller 30 directly or indirectly detects a decrease in differential pressure and its detection configuration is optional. For example, there may be adopted such a detection configuration other than the above example configurations that the controller 30 indirectly detects a decrease in differential pressure from the manipulated variable that is output by the controller 30 to the gas supply device that supplies combustion gas to the combustor. More specifically, for the case of combustors, the decrease in differential pressure is detected indirectly from the increase in manipulated variable that is output to the combustion air supply device 41 from the controller 30.

Numerous modifications and alternative embodiments of the invention will be apparent to those skilled in the art in view of the foregoing description. Accordingly, the description is to be construed as illustrative only.

INDUSTRIAL APPLICABILITY

The power generation systems according to the present invention find a beneficial use as a power generation system or other like apparatus because combustion exhaust gas from the power generation unit is mixed with atmosphere gas within the casing whereby combustible gas contained in the combustion exhaust gas is diluted and then discharged outside the casing.

REFERENCE SINGS LIST 1 power generation unit
2 casing
3 ventilator
5 first gas flow passage
6 second gas flow passage
6A cathode off-gas flow passage
6B combustion exhaust gas flow passage
7 condenser
7A condenser
7B condenser
8 combustor
10 fuel cell
11 oxidizing gas supply device
12 external combustion device
21 merging point
21A merging point
21B merging point
30 controller
41 air supply device
100A power generation system
100B power generation system
100C power generation system
100D power generation system
100E power generation system

The invention claimed is:

1. A power generation system comprising:
a power generation unit including a combustor;
a casing that accommodates said power generation unit;
a ventilator that ventilates an interior of said casing;
a first gas flow passage, arranged inside said casing, for a flow therethrough of gas which flows as said ventilator operates;
a second gas flow passage, arranged inside said casing, for a flow therethrough of combustion exhaust gas from said power generation unit;
wherein within said casing, said second gas flow passage merges into said first gas flow passage, and wherein said ventilator is disposed more upstream than a merging point of said first and second gas flow passages in said first gas flow passage.

2. The power generation system as set forth in claim 1, further comprising a condenser on said second gas flow passage, wherein said second gas flow passage merges into said first gas flow passage at a point more downstream than said condenser.

3. The power generation system as set forth in claim 1, further comprising a controller that controls an operation of said ventilator so that its discharge pressure becomes higher than a pressure of gas at said merging point.

4. The power generation system as set forth in claim 1, wherein said ventilator operates in such a manner that its discharge pressure becomes higher than a pressure of gas at the merging point.

5. The power generation system as set forth in claim 1, wherein said the combustor combusts combustible gas and wherein said second gas flow passage is a gas flow passage through which combustion exhaust gas from said combustor flows.

6. The power generation system as set forth in claim 5, further comprising a controller that controls, at the time of shutting down said power generation system, said ventilator to continue to operate at least until said combustor stops its combustion operation.

7. The power generation system as set forth in claim 5, further comprising:
a combustion air supply device that supplies combustion air to said combustor, and
a controller that controls, at the time of shutting down said power generation system, said ventilator to operate at least after said combustion air supply device stops operating.

8. The power generation system as set forth in claim 5, further comprising:
a combustion air supply device that supplies combustion air to said combustor, and
a controller that controls, at the time of shutting down said power generation system, said combustion air supply device to operate even after said combustor stops its combustion operation.

9. The power generation system as set forth in claim 1, wherein said power generation unit further includes a fuel cell, and a cathode off-gas flow passage through which cathode off-gas from said fuel cell flows, wherein said second gas flow passage comprises a combustion exhaust gas flow passage through which combustion exhaust gas from said combustor flows, and wherein the combustion exhaust gas flow passage and the cathode-off gas flow passage merge with the first gas flow passage.

10. The power generation system as set forth in claim 9, further comprising:
an oxidizing gas supply device that supplies oxidizing gas to said fuel cell, and
a controller that controls, at the time of shutting down said power generation system, said power generation system to stop generating electric power while controlling said oxidizing gas supply device to operate even after said combustor stops its combustion operation.

11. The power generation system as set forth in claim 1, further comprising a controller that controls said ventilator to operate at least during a time in which said power generation system operates to generate electric power.

12. The power generation system as set forth in claim 1, further comprising a controller that controls, at the time of shutting down said power generation system, said ventilator to continue to operate at least until discharge of combustion exhaust gas from said power generation unit stops.

13. The power generation system as set forth in claim 1, further comprising a controller that controls, at the time of shutting down said power generation system, said ventilator to continue to operate at least after the discharge of combustion exhaust gas from said power generation unit stops.

14. The power generation system as set forth in claim 1, wherein said first gas flow passage is arranged such that it extends to outside said casing so to merge into a combustion exhaust gas flow passage of an external combustion device.

15. The power generation system as set forth in claim 1, wherein said power generation unit further comprises a fuel cell, and the combustor combusts anode off-gas from said fuel cell.

16. The power generation system as set forth in claim 1, wherein the first gas flow passage couples a ventilation gas output by the ventilator directly to the merging point.

17. A power generation system comprising:
a power generation unit;
a casing that accommodates said power generation unit;
a ventilator that ventilates an interior of said casing;
a first gas flow passage arranged inside said casing, the first gas flow passage receiving a ventilation gas output by the ventilator; and
a second gas flow passage arranged inside said casing, the second gas flow receiving a combustion exhaust gas output by power generation unit;
wherein within said casing, the first gas flow passage is merged with the second gas flow passage at a merging point downstream of the power generation unit such that the ventilation gas is merged with the combustion exhaust gas downstream of the power generation unit.

18. The power generation system as set forth in claim 17, wherein the ventilation gas is an atmospheric gas.

19. The power generation system as set forth in claim 17, wherein the first gas flow passage couples the ventilation gas directly to the merging point.

* * * * *